US012353462B1

(12) United States Patent
Ahmad et al.

(10) Patent No.: US 12,353,462 B1
(45) Date of Patent: Jul. 8, 2025

(54) SYSTEMS AND METHODS TO GENERATE RESPONSES TO QUERIES CONVEYED BY AUDIO INFORMATION

(71) Applicant: Suki AI, Inc., Redwood City, CA (US)

(72) Inventors: Feroz Ahmad, Sunnyvale, CA (US); Siddharth Sharma, Gurugram (IN); Belwadi Srikanth, Santa Clara, CA (US); Prasanth Kolachina, Bangalore (IN); Khaled Hafez, Mountain View, CA (US)

(73) Assignee: Suki AI, Inc., Redwood City, CA (US)

( * ) Notice: Subject to any disclaimer, the term of this patent is extended or adjusted under 35 U.S.C. 154(b) by 0 days.

(21) Appl. No.: 18/428,759

(22) Filed: Jan. 31, 2024

(51) Int. Cl.
| | |
|---|---|
| *G06F 16/338* | (2019.01) |
| *G06F 16/332* | (2019.01) |
| *G06F 16/3329* | (2025.01) |
| *G06F 16/334* | (2025.01) |
| *G10L 15/26* | (2006.01) |

(52) U.S. Cl.
CPC ........ *G06F 16/338* (2019.01); *G06F 16/3326* (2019.01); *G06F 16/3329* (2019.01); *G06F 16/3344* (2019.01); *G10L 15/26* (2013.01)

(58) Field of Classification Search
CPC .................................................. G06F 16/338
See application file for complete search history.

(56) References Cited

U.S. PATENT DOCUMENTS

2020/0050586 A1\* 2/2020 Pal ..................... G06F 16/148
2023/0367973 A1\* 11/2023 Konam ................ G06F 40/40

OTHER PUBLICATIONS

Guangxuan Xiao, et al. 'Efficient Streaming Language Models with Attention Sinks'. arXiv [Cs.CL], Dec. 12, 2023 (pp. 1-20), http://arxiv.org/abs/2309.17453. arXiv.
Maithri Vm, "Hybrid Search—Amalgamation of Sparse and Dense vector representations for Active Content Discovery"; Medium; May 14, 2023 [retreived Feb. 1, 2024] (19 pages); https://medium.com/@maithri.vm/hybrid-search-amalgamation-of-sparse-and-dense-vector-representations-for-active-content-107828b30be5.

(Continued)

*Primary Examiner* — Van H Oberly
(74) *Attorney, Agent, or Firm* — Esplin & Associates, PC

(57) ABSTRACT

Systems and methods to generate responses to queries conveyed by audio information are disclosed. Exemplary implementations may: obtain audio information that represents sounds captured by a client computing platform; generate, by performing speech recognition on the audio information, a transcript representing the utterances; generate engine instructions for a response engine, wherein the response engine is configured to obtain output from one or more resources to determine a final response to the query, wherein the engine instructions include at least part of the transcript and distinguishing descriptions for individual ones of the resources, wherein the distinguishing descriptions for the individual resources include specifications of types of information output by the individual resources; initiate transmission of the engine instructions to the response engine; receive, from the response engine, the final response determined by the response engine for the engine instructions; and effectuate presentation of the final response via the client computing platform.

14 Claims, 3 Drawing Sheets

(56) References Cited

OTHER PUBLICATIONS

Shane Connelly, "Practical BM25—Part 2: The BM25 Algorithm and its Variables"; elastic; Apr. 19, 2018 [retreived Feb. 1, 2024] (15 pgs); https://www.elastic.co/blog/practical-bm25-part-2-the-bm25-algorithm-and-its-variables.
Shunyu Yao, et al. 'ReAct: Synergizing Reasoning and Acting in Language Models'. arXiv [Cs.CL], Mar. 10, 2023 (pp. 1-33); http://arxiv.org/abs/2210.03629. arXiv.

* cited by examiner

SYSTEMS AND METHODS TO GENERATE RESPONSES TO QUERIES CONVEYED BY AUDIO INFORMATION

FIELD OF THE DISCLOSURE

The present disclosure relates to systems and methods to generate responses to queries conveyed by audio information.

BACKGROUND

During conversation sessions between caregivers and subjects regarding the subjects, the caregivers may obtain information to view, confirm information, and/or determine information that is relevant to the subjects to facilitate providing care. Such information may be stored in and provided by various distinct resources. Individual ones of the resources may require the caregivers to provide input in a specific format in order to obtain the information they are pursuing, which may be time consuming and/or require excessive processing.

SUMMARY

One aspect of the present disclosure relates to a system configured to generate responses to queries conveyed by audio information. The system may include one or more hardware processors configured by machine-readable instructions. The machine-readable instructions may include one or more instruction components. The instruction components may include computer program components. The instruction components may include one or more of information obtaining component, transcript generating component, engine instruction generating component, response engine utilizing component, presentation effectuation component, and/or other instruction components.

The information obtaining component may be configured to obtain audio information that represents sounds captured by a client computing platform. The sounds convey utterances from at least a caregiver.

The transcript generating component may be configured to generate, by performing speech recognition on the audio information, a transcript representing the utterances. The transcript may include a query uttered by the caregiver.

The engine instruction generating component may be configured to generate engine instructions for a response engine. The response engine may be configured to obtain output from one or more resources to determine a final response to the query. The engine instructions may include at least part of the transcript and distinguishing descriptions for individual ones of the resources. The distinguishing descriptions for the individual resources may include specifications of types of information output by the individual resources.

The response engine utilizing component may be configured to initiate transmission of the engine instructions to the response engine. The response engine utilizing component may be configured to receive, from the response engine, the final response determined by the response engine for the engine instructions.

The presentation effectuation component may be configured to effectuate presentation of the final response via the client computing platform.

This system may enable efficient processing by eliminating the need to obtain and render excessive information (e.g., imaging, complete electronic medical records, excessive search results) from multiple ones of the resources to determine the final response to the query. Instead, the system enables obtainment of strictly relevant information from the resources to determine the final response. Furthermore, the system enables the caregiver and/or other participants to speak and provide queries naturally as opposed to in accordance with one or more structured commands, by manually inputting one or more instructions in accordance with computer languages suitable for the resources, or manually navigating multiple virtual pages (e.g., electronic medical records, medical knowledge literature) to determine the final response. Moreover, the final response may be reasonably concise for the participants to comprehend.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
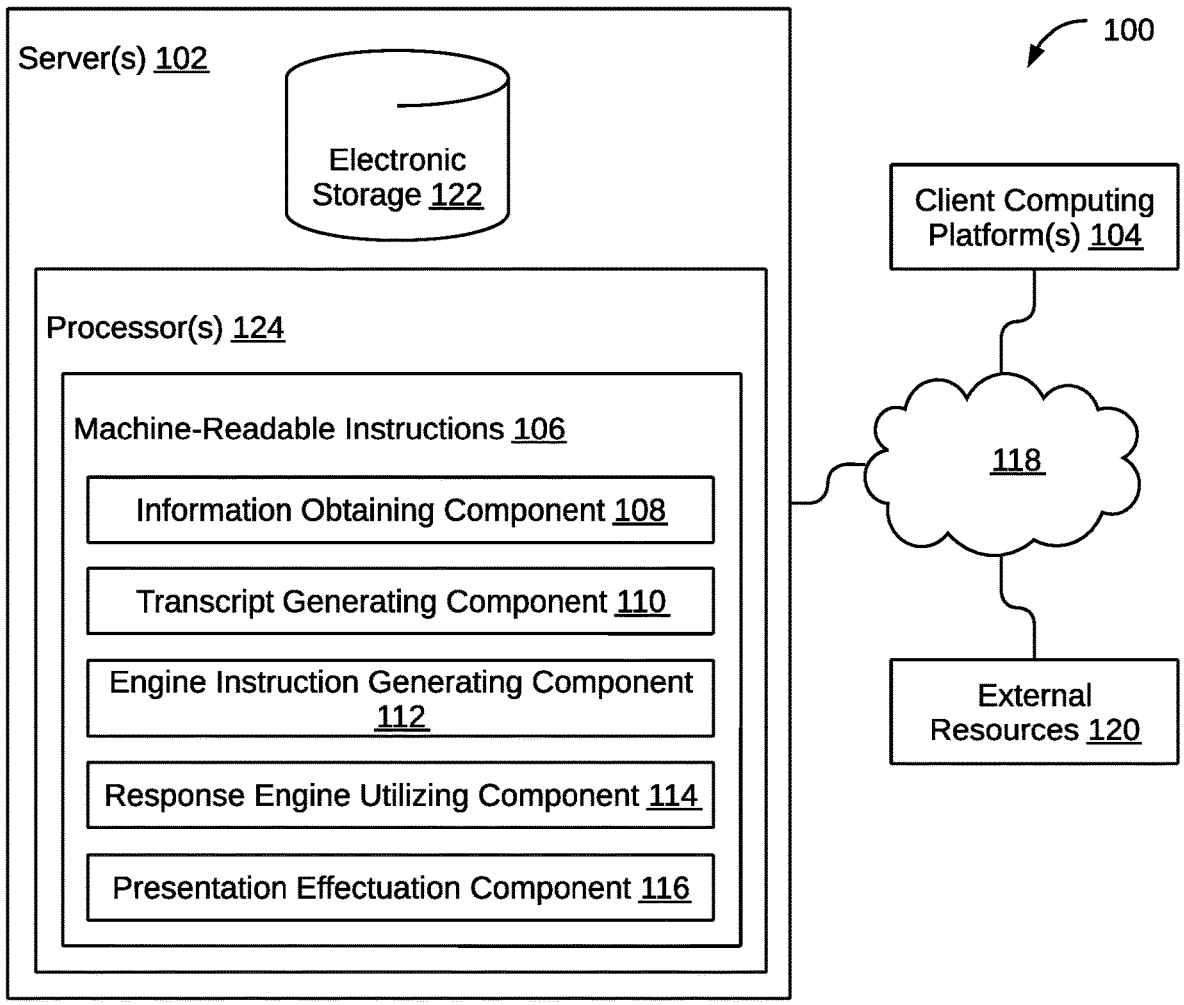
FIG. 1 illustrates a system configured to generate responses to queries conveyed by audio information, in accordance with one or more implementations.

FIG. 1 illustrates a system 100 configured to generate responses to queries conveyed by audio information, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of information obtaining component 108, transcript generating component 110, engine instruction generating component 112, response engine utilizing component 114, presentation effectuation component 116, and/or other instruction components.

Information obtaining component 108 may be configured to obtain audio information that represents sounds captured by client computing platform 104. The sounds convey utterances from participants. The participants may include one or more caregivers, a subject, and/or other participants. The caregivers may include a doctor, a nurse, a legal guardian, and/or other caregiver of the subject. One or more of the participants may be users of system 100. It is to be understood that the utterances by the participants and circumstances described herein may be related to the medical field for exemplary purposes only and are not intended to be limiting as the functionalities described herein may be applied in various other fields that are not the medical field.

The audio information may include digital audio signals that encode sounds of individual utterances of the participants, a recording of the individual utterances of the participants, and/or other audio information. In some implementations, the sounds conveying the utterances of the participants may be detected by the audio input device, such as a microphone, of client computing platform 104. In some implementations, the sounds may be converted to the digital audio signals by converting analog waves to the digital audio signals by precisely measuring the analog waves at consistent and frequent intervals. The recording of the individual utterances may include a digital file of a reproduction of the digital audio signals that cause the sounds, and thus convey the utterances, the digital audio signals, and/or other recording. In some implementations, information obtaining component 108 may be configured to generate the audio information based on the sounds in response to silence that follows individual ones of the utterances from the different participants, a change in the participant speaking detected, and/or user input via user interface elements (e.g., selecting a virtual button). In some implementations, the silence may be for a particular amount of time that may be fixed or modifiable by the users. In some implementations, the audio information may be stored in electronic storage 122 in association with the subject.

Transcript generating component 110 may be configured to generate a transcript representing the utterances. The transcript may be generated by performing known and/or novel speech recognition techniques on the audio information. The transcript may be a textualized representation of the utterances represented by the audio information. The utterances may include one or more queries uttered by the participants, one or more commands uttered by the one or more caregivers, and/or other information uttered by the participants. By way of non-limiting example, the utterances may include a query uttered by a caregiver.

Engine instruction generating component 112 may be configured to generate engine instructions for a response engine. The engine instructions may request a final response to the query included in the transcript by utilizing one or more resources. The response engine may utilize the engine instructions to recognize the query and employ the resources to provide the final response to the participants. The final response may be presented to the one or more participants via client computing platform 104. In some implementations, the final response may include text, images, videos, links, and/or other content to convey information that is responsive to the query.

The response engine may be configured to obtain output from one or more resources to determine the final response to the query. In some implementations, the response engine may be a large language model configured to obtain the output from the one or more resources. Based on the output from the one or more resources that are based on the utterances conveyed in the transcript, the large language model may determine the final response to the query. That is, the large language model may generate the final response based on the output from the one or more resources. In some implementations, the final response may be determined and obtained from one of the resources.

In some implementations, the large language model may be Transformer-based which has been previously trained on a plurality of generic information to generate output text based on the information received. The large language model may be Encoder-Decoder based with a plurality of model parameters where the large language model is trained on a variety of language tasks. The large language model may utilize both the Encoder and Decoder components of the architecture during training. The Decoder may only be used for generation of the output text. In some implementations, the large language model may be fine-tuned on specific training information or open-source clinical information, which may improve the quality of the generated content blocks described herein.

In some implementations, the response engine may be a custom Encoder-Decoder based Transformer model that may be used to receive text from the resources as input to the Encoder. The Encoder may generate high-dimensional representations of the input text, which is utilized by the Decoder to generate appropriate content, i.e., the final response.

The engine instructions may include part of the transcript that includes at least the query, distinguishing descriptions for individual ones of the resources, and/or other information. In some implementations, the engine instructions may include the transcript in its entirety. The resources may include, but are not limited to, an electronic medical record datastore, a schedule manager, a medical knowledge datastore, a code runtime tool, a search engine tool, and/or other resources. The descriptions for the individual resources may characterize a purpose of the individual resources to distinguish the resources from other ones of the resources. The distinguishing descriptions may facilitate the response engine in selecting and employing one or more of the resources to utilize for determining the final response. The distinguishing descriptions for the individual resources may include specifications of types of information output by the individual resources.

The electronic medical record datastore may be a database that indexes entities in vectors and associates the entities with keywords. The vectors may represent values for parameters, relationships between the entities, and/or other information. For example, a first entity may be a subject. The first entity may represent values to a name, a gender, a date of birth, among other parameters to define the subject. A second entity may be a condition (e.g., diabetes). The second entity may represent values to a glucose level, an insulin level, among other parameters. The electronic medical record datastore may store a relationship between the first entity and the second entity to specify that the subject formerly had the condition. The keywords associated with the entities may facilitate searching for the entities. For example, the second entity may be associated with the keyword "condition". Searching amongst the electronic medical record datastore may be in accordance with the keywords, the values, and/or other information. Thus, the electronic medical record datastore may output medical information about the subjects.

The medical knowledge datastore may be a database that stores information and/or definitions about terms, procedures, symptoms, medications, side effects, literature, historical cases, clinical trials, and/or other information related to the medical field. The information stored in the medical knowledge datastore may include one or more of text, images, laboratory results, caregiver notes, and/or other information. Thus, the medical knowledge datastore may output such information to provide knowledge related to the medical field.

The code runtime tool may generate python code based on input (i.e., resource instruction described herein) and execute the python code to perform calculations by employing mathematical operations. Thus, the code runtime tool may output calculation results produced by performing the calculations.

The search engine tool may generate supplementary queries suitable for individual search engines (e.g., Google, Bing, Wikipedia) based on input (i.e., resource instruction described herein). In some implementations, the individual search engines may provide more accurate search results responsive to particular formats of the supplementary queries. Thus, the search engine tool may output search results produced by submitting the supplementary queries to the individual search engines.

The schedule manager may manage calendar availability of the caregivers, access calendar availability for the subjects, send calendar invites, send responses to calendar invites, and/or other schedule management activities. Thus, the schedule manage may output dates, times, feedback (e.g., confirmation of appointment, rejection of appointment, alternative dates and times), and/or other scheduling information that indicates finalized or tentative appointments on calendars for the participants.

Response engine utilizing component 114 may be configured to initiate transmission of the engine instructions to the response engine. In some implementations, the response engine may be stored in electronic storage 122, a cloud storage accessible via network 118, and/or other storage accessible via network 118. Access to such storage may include providing input and receiving output from such storage. Thus, in some implementations, transmission of the engine instructions to the response engine may be via network 118.

In some implementations, the response engine may be configured to determine the query included in the transcript, or part thereof, based on the engine instructions. Determining the query may include analyzing the transcript for individual pronouns and individual entities. The pronouns may be words that refer to an entity uttered. By way of non-limiting example, the pronouns may include it, he, she, they, you, we, I, and/or variations thereof. Based on the analysis of the transcript, the response engine may be configured to identify the pronouns.

Furthermore, one or more entities included in the transcript that the individual pronouns are referring to may be determined based on the analysis. By way of non-limiting example, the entities may include a section in note, a parameter in the note (e.g., blood pressure, glucose, hemoglobin), a body part (e.g., left collarbone), an uttered entity (e.g., a symptom, a medication, a location), and/or other entities. Furthermore, the individual pronouns may be replaced with the entity that the individual pronouns refer to in the transcript (or part thereof). Thus, in some implementations, a supplementary transcript may be generated that directly specifies and refers to the entity consistently throughout the transcript instead of using pronouns. In some implementations, the transcript, or part thereof, included in the engine instructions may be modified by replacing the individual pronouns with the entity. In some implementations, more than one distinct entity may be determined in the transcript. Thus, the response engine may be configured to determine the individual pronouns and determine one of the entities that the individual pronouns refer to, and subsequently replace the individual pronouns with the individual appropriate entities.

In some implementations, the response engine may be configured to determine whether the query is related to one or more queries that the response engine previously provided final responses for. In some implementations, the response engine may be configured to determine whether the query is related to previously executed commands (represented in the transcript or parts thereof) and/or other utterances (represented in the transcript or parts thereof). That is, the response engine may determine whether the entities included in the query are related to or are the same as the entities included in the one or more previous queries, conveyed in the other utterances, and/or included in previously executed commands. Determining whether the entities are related may include determining whether (i) the entities in the query, (ii) the one or more previous queries, (iii) the previously executed commands, (iv) the other utterances represented by the transcript, and/or other entities previously established as related to the entities are within the same entity class, are within entity classes that are associated with other entity classes, are within one or more sections of notes, and/or other relations.

In some implementations, the entities may be categorized into different entity classes. The entity classes may be different sets of related features and parameters that may be uttered, and in some implementations, included in notes as they are being automatically populated. The notes may include medical notes, legal notes, mechanical notes, and/or notes specific to other knowledge domains. The entity classes and notes described herein may be related to the medical knowledge domain for exemplary purposes and is not intended to be limiting. The medical knowledge domain may refer to terms, phrases, entities, literature, transcripts, values, and/or other information that are related to medicine. However, other knowledge domains may be utilized additionally or alternatively such as education, auto mechanics, among others. By way of non-limiting example, the entity classes may include at least complaints, allergies, conditions, medications, procedures, medical devices, appointments, circulatory system, and/or other entity classes. In some implementations, the entity classes stored may be modified by the users adding and/or removing one or more entity classes via client computing platforms 104. By way of non-limiting example, the entities for the allergies entity class may include tree nuts, soy, gluten, dairy, among other allergies. As another example, the entities in the circulatory system entity class or related to thereof may include blood pressure, a vitals section of notes, among others.

By way of non-limiting example, the previous queries may include or refer to an entity "blood pressure" so that the final response is about blood pressure. The query that follows may inquire a calculation of an amount of time between two entities that specify dates, i.e., date entities. The response engine may determine that the date entities are unrelated to and different from the blood pressure entity. As such, the response engine may proceed to determine the resources that are relevant to the query. Upon determination that the entities are related and/or are the same, the response engine may utilize the responses that such previous queries caused and/or outcomes that the previous commands caused.

Based on the engine instructions, the response engine may be configured to determine one or more of the resources that are relevant to the query. Relevancy of one or more of the resources to the query may be that the query refers to entities that, as indicated in the descriptions of the resources, are stored or determinable by the one or more resources.

In some implementations, the one or more resource instructions may be generated in a computer language readable by the one or more determined resources. By way of non-limiting example, the computer language may be structured query language (SQL), Python, among others. By way of non-limiting example, the first determined resource may receive the resource instructions in accordance with a first computer language.

In some implementations, the resource instructions generated for the search engine tool and/or the code runtime tool may include all the entities determined in the query, the part of the transcript, and/or the transcript. Thus, In some implementations, the search engine tool and/or the code runtime tool may be configured to the supplementary queries suitable for individual search engines and/or the python code, respectively, based on the entities included in the respective resource instructions.

In some implementations, the medical knowledge datastore may be coupled with a medical knowledge datastore tool. The resource instructions generated for the medical knowledge datastore may include all the entities determined in the query, the part of the transcript, and/or the transcript. Thus, the medical knowledge datastore tool may be initiated by the resource instructions generated by the response engine to generate a medical knowledge datastore-specific instruction in the computer language suitable for the medical knowledge datastore. Subsequently, the medical knowledge datastore tool may employ the medical knowledge datastore by provide the medical knowledge datastore-specific instruction to the medical knowledge datastore.

Furthermore, based on the engine instructions, the response engine may be configured to determine an order in which to generate and subsequently provide one or more resource instructions to the one or more determined resources based on the query. That is, in succession, the one or more resource instructions may be generated and provided to the respective one or more determined resources in the determined order. Based on the engine instructions, the response engine may be configured to execute the order. Subsequent to providing the one or more resource instructions to the respective one or more determined resources, individually, individual responses may be output by the determined resources and obtained by the response engine.

By way of non-limiting example, a first resource and a second resource may be determined as relevant to the query. The response engine may determine that the order the resource instructions should be generated and provided is, first, a first resource instruction may be generated and provided to the first determined resource so that a first response is received by the response engine. Subsequently, the order may specify that a second resource instruction may be generated and provided to the second determined resource so that a second response is received by the response engine.

In some implementations, individual responses from the determined resources may be errors. An error may represent that a response from a given resource could not be determined or otherwise provided in response to a given resource instruction. The errors may be conveyed in a textual message (e.g., "error", "no value", "no results"), as an empty response, as binary number, and/or other error representation. In some implementations, the errors may include an error code that indicates a fault that caused the error (e.g., syntax, missing value). By way of non-limiting example, the first response from the first determined resource may be an error responsive to the first resource instruction.

Responsive to individual ones of the errors output by the determined resources, the response engine may be configured to re-generate the resource instructions in the respective computer languages for the resources. Re-generating the individual resource instructions may include adjusting syntax in accordance with the computer languages, adjusting value precision, adjusting formatting, and/or other adjustments so that the resource instructions are re-generated. By way of non-limiting example, responsive the error being output by the first determined resource as the first response, the first resource instruction may be re-generated so that a composition of the first resource instruction in the first computer language is adjusted.

Subsequent to the re-generation, the response engine may be configured to re-provide the adjusted resource instructions to the determined resources. By way of non-limiting example, the first resource instruction, subsequent to re-generation, may be re-provided to the first determined resource to elicit an acceptable response.

In some implementations, re-generation of the individual resource instructions may be limited to an iteration threshold. The iteration threshold may be a maximum amount of time that the individual resource instructions may be re-generated and re-provided to the resources upon receiving errors as the responses from the resources. The iteration threshold may be three, five, or other amount. In some implementations, the iteration threshold may be definable and modifiable by the caregivers. In some implementations, the iteration threshold may be fixed. By way of non-limiting example, the response engine may be configured to re-generate the first resource instruction up to the iteration threshold responsive to receipt of errors from the first determined resource.

In some implementations, the individual responses from the one or more determined resources may be utilized to generate subsequent ones of the one or more resource instructions. In some implementations, the response engine may be configured to store the individual responses in a temporary storage upon receipt. The temporary storage may facilitate generation of subsequent ones of the resource instructions that are related to similar or the same information conveyed in the responses from the determined resources. By way of non-limiting example, the temporary storage may include cache and/or other temporary storage. The temporary storage may be included in or connected to electronic storage 122, the cloud storage, external resources 120, and/or other temporary storage or services. As such, generating the subsequent resource instructions related to the stored responses utilizes the stored responses. That is, upon receipt of a given response from one of the determined resources, such given response may be stored in the temporary storage, and may be utilized in generating a subsequent resource instruction, according to the order. Furthermore, as such, generating the one or more resource instructions for subsequent queries conveyed in the transcript of which are related to the stored responses may utilize the stored responses.

In some implementations, the order may include multiple resource instructions and two or more of the multiple resource instructions may be generated for and provided to the same determined resource. For example, the first resource may be provided the first resource instruction so that the first response is received by the response engine. Furthermore, a third resource instruction may be generated and provided to the first resource so that a third response is received by the response engine.

As a result, in some implementations, the response engine may be configured to generate the final response based on the responses received from the one or more determined resources. For example, the response engine may generate the final response based on the first response and the third response. As a result, in some implementations, the final response may be obtained from the one or more determined resource that is last in the order. Subsequently, the response engine may be configured to transmit the final response to processor(s) 124 (e.g., response engine utilizing component 114).

In some implementations, the response engine may be configured to update, upon receipt of the individual errors, a negative feedback record with the first resource instruction and the first determined resource that output the error. The negative feedback record may record correlations between the individual resource instructions, the determined resources they were provided to, the individual errors, and/or other information. The response engine may be configured to update a positive feedback record upon receipt of the individual responses from the one or more determined resources that are not erroneous. The positive feedback record may record correlations between the individual resource instructions, the determined resources they were provided to, the individual responses, and/or other information.

Thus, in some implementations, generating subsequent resource instructions for the one or more determined resources may be based on the negative feedback record and the positive feedback record. The negative feedback record and the positive feedback record may facilitate fine-tuning the generation of the resource instructions thereafter to avoid the errors, increase response obtainment, and/or increase response accuracy.

In some implementations, information obtaining component 108 configured to receive user feedback related to the individual responses from the resources and/or the final response. The user feedback may be provided by the caregivers and/or other ones of the users specifying whether the individual responses from the resources and/or the final response are accurate, precise, whether they required modification (e.g., syntax, grammar, capitalization, measurement units), and/or other user feedback. The negative feedback record and/or the positive feedback record may be updated based on the user feedback.

Response engine utilizing component 114 may be configured to receive, from the response engine, the final response determined by the response engine for the engine instructions. In some implementations, in addition to the final response, the individual responses received by the response engine from the determined resources may be received by response engine utilizing component 114 from the response engine.

Presentation effectuation component 116 may be configured to effectuate presentation of the final response via client computing platform 104. In some implementations, presentation effectuation component 116 may be configured to effectuate presentation of the individual responses from the resources via client computing platform 104. In some implementations, the presentation of the final response and/or the individual responses may be audibly presented via an audio output device. The audio output device may include one or more speakers, one or more headphone devices, one or more earphone devices, one or more hearing aids, and/or other audio output device that produce sound. In some implementations, the presentation of the final response may be visually presented via a presentation device of client computing platform 104. The presentation device may include a display screen of a Smart device, a television screen, a projector, a computer monitor, and/or other presentation device that produces visual and/or audible content. The presentation of the final response and/or the individual responses may facilitate the users in providing the user feedback.

Figure 3:
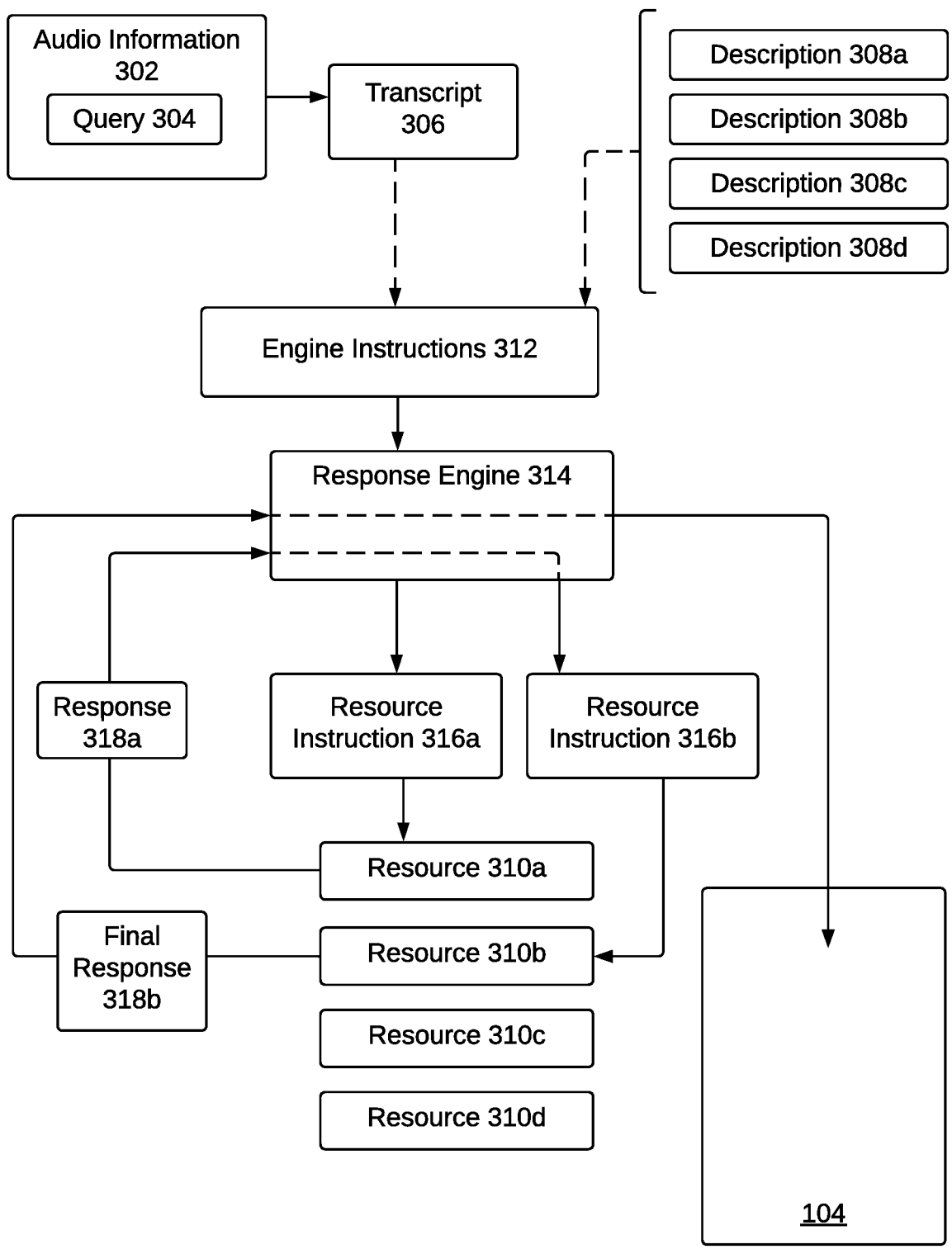
FIG. 3 illustrates an example implementation of the system configured to generate responses to queries conveyed by audio information, in accordance with one or more implementations.

FIG. 3 illustrates audio information 302 that convey a query 304 uttered by a user. A transcript 306 may be generated based on audio information 302 such that transcript 306 textually represents audio information 302. Descriptions 308a-d may distinguish and specify types of information output by resources 310a-d, respectively. Engine instructions 312 may be generated based on descriptions 308a-d and transcript 306 such that at least descriptions 308a-d and transcript 306 are included in engine instructions 312. Engine instructions 312 may be provided to a response engine 314. Based on engine instructions 312, response engine 314 may generate resource instruction 316a and 316b for resources 310a and 310b, respectively. Response engine 314 may determine an order to provide resource instruction 316a and 316b to resources 310a and 310b, respectively. That is, resource instruction 316a may be provided to resource 310a. Subsequently, response 318a may be output from resource 310a and utilized to generate resource instruction 316b. Resource instruction 316b may subsequently be provided to resources 318b such that resource 318b outputs final response 318b. Response engine 314 may obtain final response 318b from resource 310b and enable presentation of final response 318b via client computing platform 104 for the user.

Referring back to FIG. 1, in some implementations, server(s) 102, client computing platform(s) 104, and/or external resources 120 may be operatively linked via one or more electronic communication links. For example, such electronic communication links may be established, at least in part, via network 118 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 120 may include sources of information outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with network 118 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, and/or 116, and/or other components. Processor(s) 124 may be configured to execute components 108, 110, 112, 114, and/or 116, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 124 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 124 may be configured to execute one or more additional components that may perform some or all of the functionality attributed below to one of components 108, 110, 112, 114, and/or 116.

Figure 2:
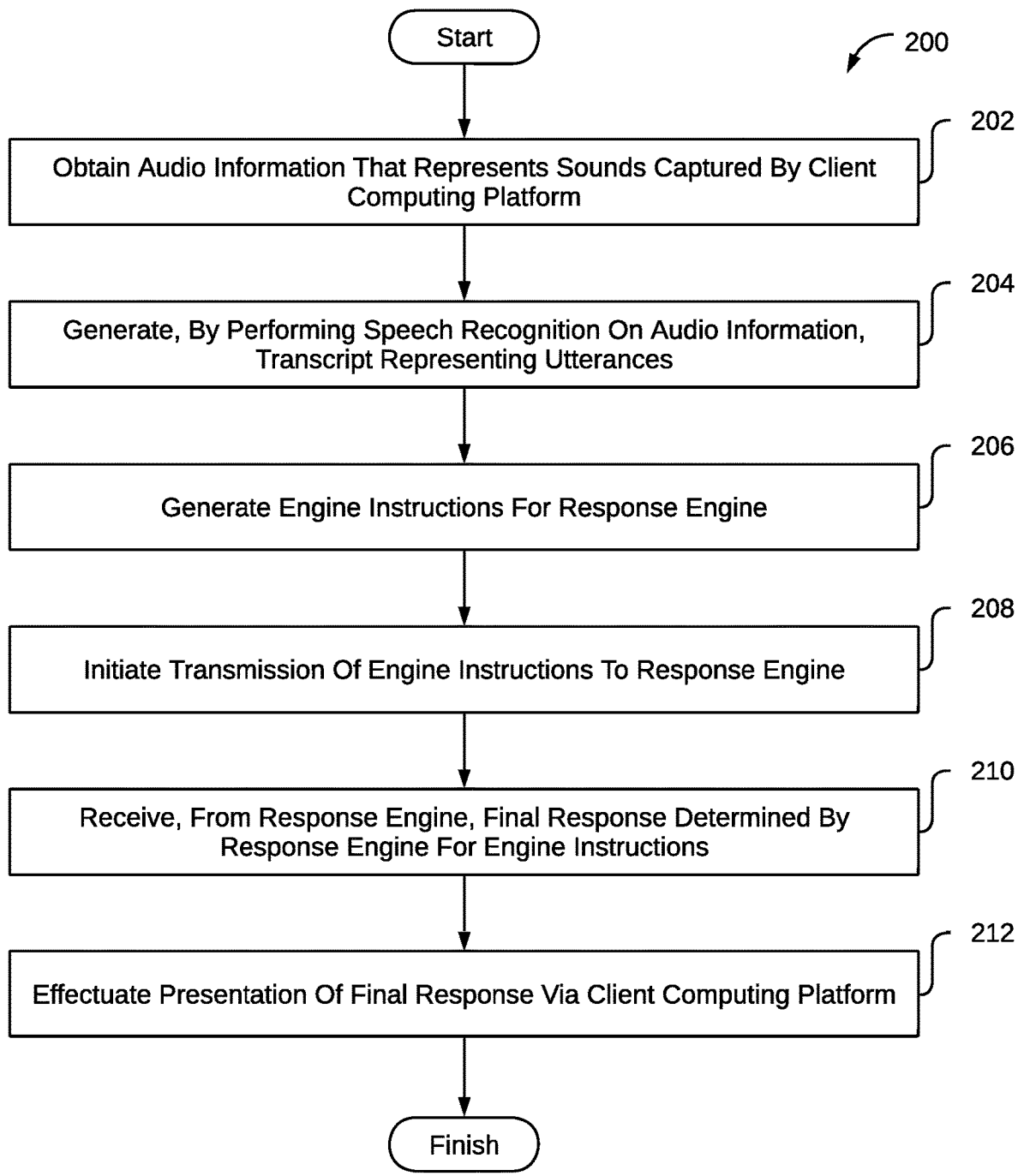
FIG. 2 illustrates a method to generate responses to queries conveyed by audio information, in accordance with one or more implementations.

FIG. 2 illustrates a method 200 to generate responses to queries conveyed by audio information, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining audio information that represents sounds captured by a client computing platform. The sounds convey utterances from at least a caregiver. Operation 202 may be performed by one or more hardware processors configured by machine-readable instructions including a component that is the same as or similar to information obtaining component 108, in accordance with one or more implementations.

An operation 204 may include generating, by performing speech recognition on the audio information, a transcript representing the utterances. The transcript may include a query uttered by the caregiver. Operation 204 may be performed by one or more hardware processors configured by machine-readable instructions including a component that is the same as or similar to transcript generating component 110, in accordance with one or more implementations.

An operation 206 may include generating engine instructions for a response engine. The response engine may be configured to obtain output from one or more resources to determine a final response to the query. The engine instructions may include at least part of the transcript and distinguishing descriptions for individual ones of the resources. The distinguishing descriptions for the individual resources may include specifications of types of information output by the individual resources. Operation 206 may be performed by one or more hardware processors configured by machine-readable instructions including a component that is the same as or similar to engine instruction generating component 112, in accordance with one or more implementations.

An operation 208 may include initiating transmission of the engine instructions to the response engine. Operation 208 may be performed by one or more hardware processors configured by machine-readable instructions including a component that is the same as or similar to response engine utilizing component 114, in accordance with one or more implementations.

An operation 210 may include receiving, from the response engine, the final response determined by the response engine for the engine instructions. Operation 210 may be performed by one or more hardware processors configured by machine-readable instructions including a component that is the same as or similar to response engine utilizing component 114, in accordance with one or more implementations.

An operation 212 may include effectuating presentation of the final response via the client computing platform. Operation 212 may be performed by one or more hardware processors configured by machine-readable instructions including a component that is the same as or similar to presentation effectuation component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate responses to queries conveyed by audio information, the system comprising:
    one or more processors configured by machine-readable instructions to:
        obtain audio information that represents sounds captured by a client computing platform, wherein the sounds convey utterances from at least a caregiver;
        generate, by performing speech recognition on the audio information, a transcript representing the utterances, wherein the transcript includes a query uttered by the caregiver;
        generate engine instructions for a response engine, wherein the response engine is configured to obtain output from one or more resources to determine a final response to the query, wherein the engine instructions include at least part of the transcript and distinguishing descriptions for individual ones of the resources, wherein the distinguishing descriptions for the individual resources include specifications of types of information output by the individual resources;
        initiate transmission of the engine instructions to the response engine, wherein based on the engine instructions, the response engine is configured to:
            determine the query included in the part of the transcript;
            determine one or more of the resources that are relevant to the query;
            determine an order in which to generate and provide one or more resource instructions to the one or more determined resources based on the query, wherein the one or more resource instructions are generated in a computer language readable by the one or more determined resources and individual responses from the one or more determined resources are utilized to generate subsequent ones of the one or more resource instructions;
            execute the order such that the final response is obtained from the determined resource that is last in the order; and
            transmit the final response to the one or more processors;
        receive, from the response engine, the final response determined by the response engine for the engine instructions; and
        effectuate presentation of the final response via the client computing platform;
    wherein the one or more determined resources include a first determined resource that receives the resource instructions in accordance with a first computer language, wherein a first response from the first determined resource is an error responsive to a first resource instruction, wherein the response engine is configured to:
        re-generate the first resource instruction so that a composition of the first resource instruction in the first computer language is adjusted; and
        re-provide the first resource instruction to the first determined resource.

2. The system of claim 1, wherein the response engine is configured to re-generate the first resource instruction up to an iteration threshold responsive to receipt of errors from the first determined resource.

3. The system of claim 1, wherein the response engine is configured to:
    update, upon receipt of the error, a negative feedback record with the first resource instruction and the first determined resource that output the error; and
    update a positive feedback record upon receipt of the individual responses from the one or more determined resources that are not erroneous, wherein generating subsequent resource instructions for the one or more determined resources is based on the negative feedback record and the positive feedback record.

4. The system of claim 3, wherein the one or more processors configured by the machine-readable instructions are further configured to:
    receive user feedback related to the final response, wherein the negative feedback record and the positive feedback record are updated based on the user feedback.

5. The system of claim 1, wherein the order includes multiple resource instructions, wherein two or more of the multiple resource instructions are generated for and provided to the same determined resource.

6. The system of claim 1, wherein determining the query includes:
    analyzing the transcript for individual pronouns;
    determining an entity included in the transcript that the individual pronouns are referring to; and
    replacing the individual pronouns with the entity that the individual pronouns refer to.

7. The system of claim 1, wherein the response engine is configured to:

store the individual responses in a temporary storage upon receipt such that generating the one or more resource instructions for subsequent queries conveyed in the transcript that are related to the stored responses utilize the stored responses.

8. A method to generate responses to queries conveyed by audio information, the method performed by one or more processors, the method comprising:

obtaining audio information that represents sounds captured by a client computing platform, wherein the sounds convey utterances from at least a caregiver;

generating, by performing speech recognition on the audio information, a transcript representing the utterances, wherein the transcript includes a query uttered by the caregiver;

generating engine instructions for a response engine, wherein the response engine is configured to obtain output from one or more resources to determine a final response to the query, wherein the engine instructions include at least part of the transcript and distinguishing descriptions for individual ones of the resources, wherein the distinguishing descriptions for the individual resources include specifications of types of information output by the individual resources;

initiating transmission of the engine instructions to the response engine, wherein based on the engine instructions, the response engine is configured to:

determine the query included in the part of the transcript;

determine one or more of the resources that are relevant to the query;

determine an order in which to generate and provide one or more resource instructions to the one or more determined resources based on the query, wherein the one or more resource instructions are generated in a computer language readable by the one or more determined resources and individual responses from the one or more determined resources are utilized to generate subsequent ones of the one or more resource instructions;

execute the order such that the final response is obtained from the determined resource that is last in the order; and transmit the final response to the one or more processors;

receiving, from the response engine, the final response determined by the response engine for the engine instructions; and effectuating presentation of the final response via the client computing platform;

wherein the one or more determined resources include a first determined resource that receives the resource instructions in accordance with a first computer language, wherein a first response from the first determined resource is an error responsive to a first resource instruction, wherein the response engine is configured to:

re-generate the first resource instruction so that a composition of the first resource instruction in the first computer language is adjusted; and re-provide the first resource instruction to the first determined resource.

9. The method of claim 8, wherein the response engine is configured to re-generate the first resource instruction up to an iteration threshold responsive to receipt of errors from the first determined resource.

10. The method of claim 8, wherein the response engine is configured to:

update, upon receipt of the error, a negative feedback record with the first resource instruction and the first determined resource that output the error; and update a positive feedback record upon receipt of the individual responses from the one or more determined resources that are not erroneous, wherein generating subsequent resource instructions for the one or more determined resources is based on the negative feedback record and the positive feedback record.

11. The method of claim 10, further comprising:

receiving user feedback related to the final response, wherein the negative feedback record and the positive feedback record are updated based on the user feedback.

12. The method of claim 8, wherein the order includes multiple resource instructions, wherein two or more of the multiple resource instructions are generated for and provided to the same determined resource.

13. The method of claim 8, wherein determining the query includes:

analyzing the transcript for individual pronouns;

determining an entity included in the transcript that the individual pronouns are referring to; and replacing the individual pronouns with the entity that the individual pronouns refer to.

14. The method of claim 8, wherein the response engine is configured to:

store the individual responses in a temporary storage upon receipt such that generating the one or more resource instructions for subsequent queries conveyed in the transcript that are related to the stored responses utilize the stored responses.

* * * * *